United States Patent

Shoji et al.

[11] Patent Number: 5,999,506
[45] Date of Patent: Dec. 7, 1999

[54] DATA RECORDING/REPRODUCING DEVICE AND RECORDING MEDIUM

[75] Inventors: Mamoru Shoji, Takatsuki; Yukihiro Yamasaki, Katano; Chikashi Inokuchi, Hirakata, all of Japan

[73] Assignee: Matsushita Electric Industrial Co., Ltd., Kadoma, Japan

[21] Appl. No.: 08/912,705

[22] Filed: Aug. 18, 1997

[30] Foreign Application Priority Data

Aug. 22, 1996 [JP] Japan ................................. 8-220941

[51] Int. Cl.$^6$ ............................................. G11B 7/00
[52] U.S. Cl. ............................................. 369/48; 369/54
[58] Field of Search ............................. 369/116, 124, 369/59, 58, 54, 47, 48

[56] References Cited

U.S. PATENT DOCUMENTS

| | | | |
|---|---|---|---|
| 4,246,615 | 1/1981 | Shiraishi et al. | 360/8 |
| 4,689,779 | 8/1987 | Hayashi et al. | 369/54 |
| 4,774,601 | 9/1988 | Ouchi et al. | 360/46 |
| 4,823,208 | 4/1989 | Ouchi et al. | 360/45 |
| 5,485,433 | 1/1996 | Satomura et al. | 369/58 |
| 5,592,456 | 1/1997 | Miyashita et al. | 369/59 |
| 5,648,949 | 7/1997 | Miyamoto et al. | 369/59 |
| 5,661,713 | 8/1997 | Honma | 369/124 |
| 5,675,569 | 10/1997 | Yamaguchi et al. | 369/124 |
| 5,684,772 | 11/1997 | Yamagami et al. | 369/48 |
| 5,696,757 | 12/1997 | Ozaki et al. | 369/58 |
| 5,764,608 | 7/1995 | Satomura | 369/48 |
| 5,790,495 | 5/1994 | Kimura et al. | 369/59 |
| 5,841,751 | 5/1997 | Komazaki et al. | 369/59 |

FOREIGN PATENT DOCUMENTS 5189876  7/1993  Japan .

*Primary Examiner*—Nabil Hindi
*Attorney, Agent, or Firm*—Renner, Otto, Boisselle & Sklar, P.L.L.

[57] ABSTRACT

The data recording/reproducing device according to the present invention, in response to the detected signal output from the data error detector, repeats a reading operation to form a data from a reproduced signal. The gate signal generator includes an envelope detector and a comparator. The envelope detector has a time constant which is changed in accordance with the detected signal output from the data error detector, and forms a threshold signal that generally follows a level variation of the reproduced signal in accordance with the time constant. The comparator compares the reproduced signal and the threshold signal output from the envelope detector so as to form the gate signal.

19 Claims, 14 Drawing Sheets

FIG.3A Cutoff frequency low (large time constant)
FIG.3B Cutoff frequency high (small time constant)
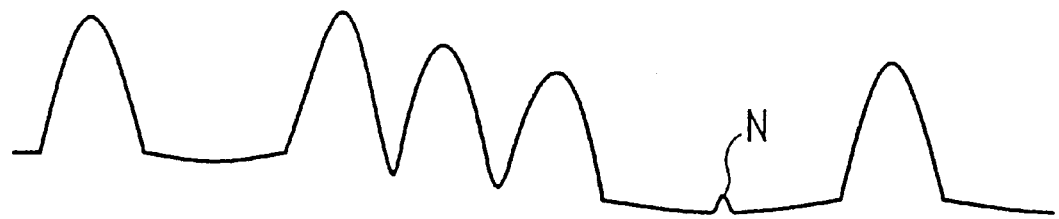

*FIG. 4A* Small time constant
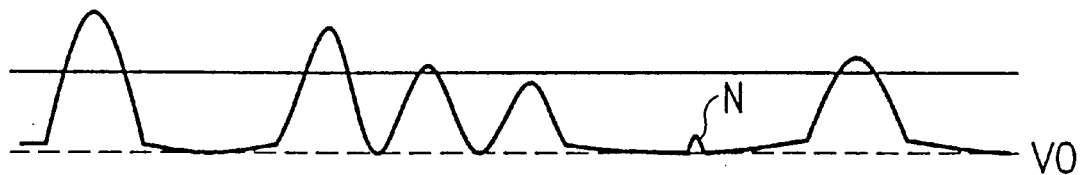
*FIG. 4B* Large time constant
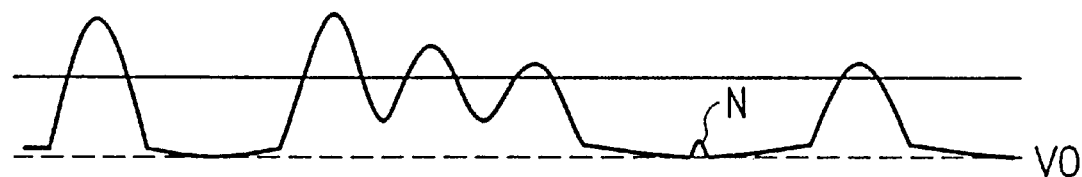

FIG. 5A Large time constant
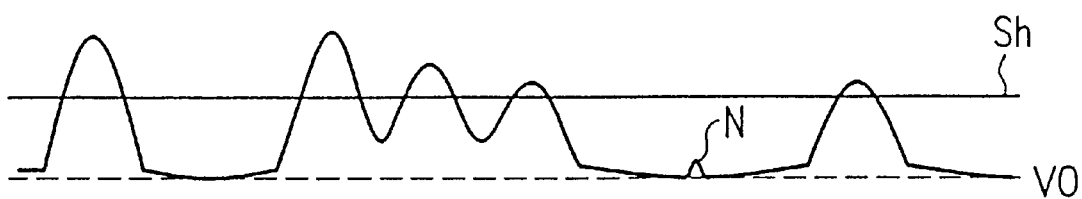
FIG. 5B Small time constant
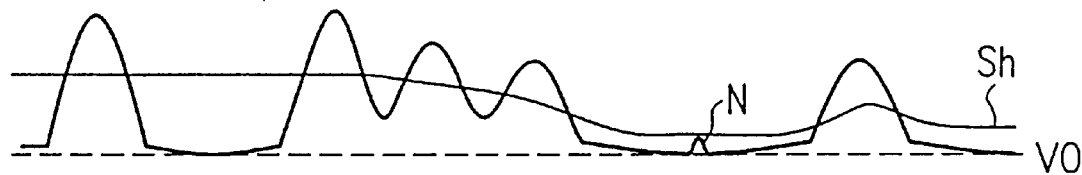

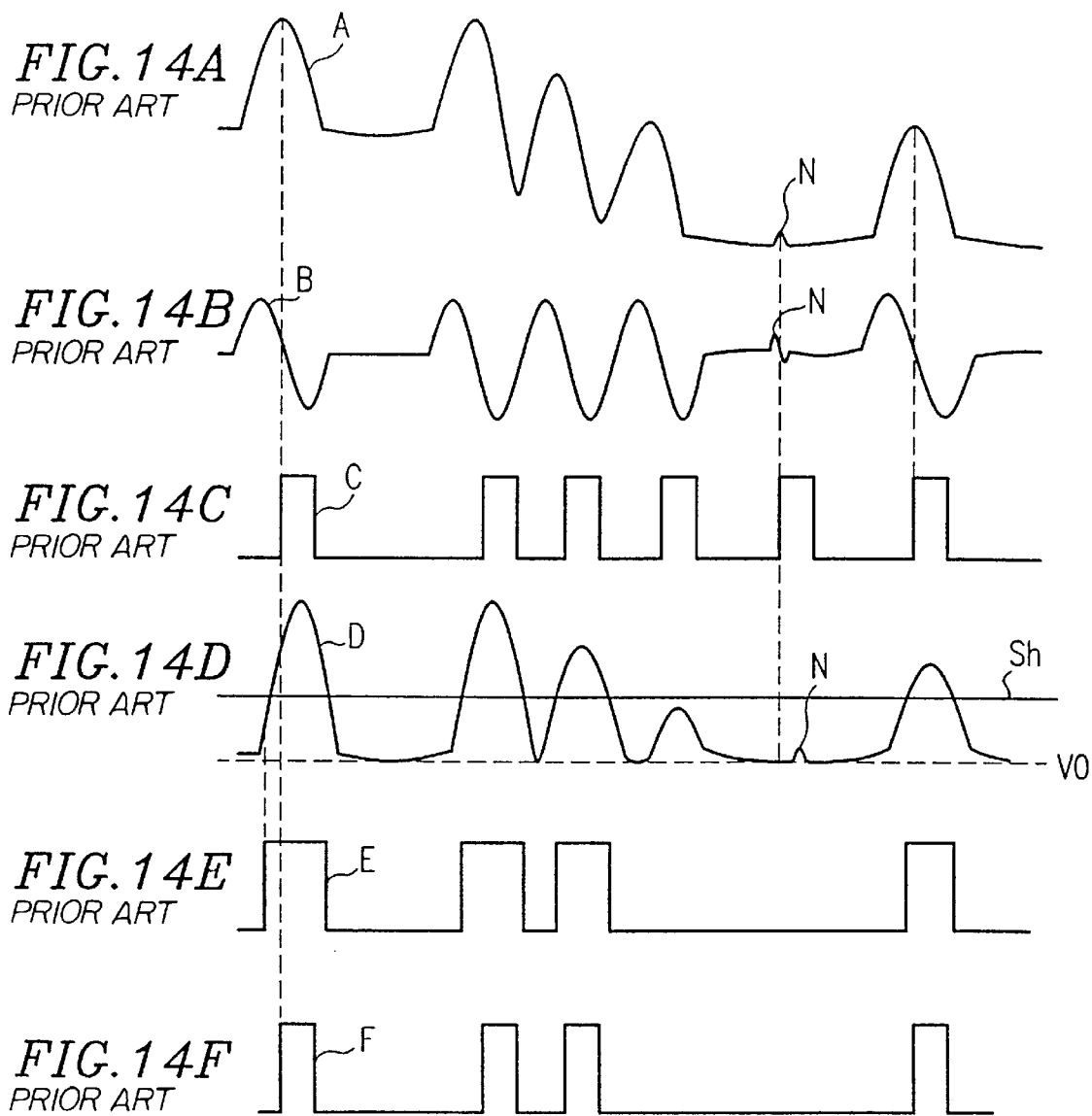

DATA RECORDING/REPRODUCING DEVICE AND RECORDING MEDIUM

BACKGROUND OF THE INVENTION

1. Field of the Invention

The present invention relates to a data recording/reproducing device which records data and reproduces data from a recording medium. The present invention also relates to a recording medium to be used in such a data recording/reproducing device.

2. Description of the Related Art

Recently, optical disk recording/reproducing devices have been receiving much attention for recording and reproducing large quantities of data. In order to achieve a higher memory density, various approaches have been taken from both a device standpoint and a recording medium standpoint. These approaches include optimization of data reproduction.

FIG. 11 is a block diagram showing an example of a conventional data recording/reproducing device. In FIG. 11, an optical disk 11 is supported by a driving shaft of a motor 12, thereby being rotated by the motor 12. An optical head 13 includes a semiconductor laser which emits a laser beam toward the optical disk 11, and a photodetector which photoelectrically converts incident light reflected off the optical disk 11 into a reproduced signal.

For recording a signal, a signal generator 14 externally receives data and modulates the received data by pulse position modulation (hereinafter, simply referred to as PPM) and/or pulse width modulation (hereinafter, simply referred to as PWM), thereby generating the signal that is to be recorded on the optical disk 11. The signal is then output to a laser driving circuit 15. The laser driving circuit 15 controls and drives the semiconductor laser of the optical head 13 in response to the input signal so that the semiconductor laser outputs an optical signal corresponding to that input signal. The optical head 13 is supported and moved by a moving mechanism (not shown) so as to trace a track(s) of the optical disk 11. When an optical signal is directed from the optical head 13 to the track(s) of the optical disk 11, while this tracing takes place, a signal corresponding to the optical signal is recorded on the track of the optical disk 11. The signal is recorded in a predetermined data unit, i.e., a sector.

On the other hand, the signal recorded on the optical disk 11 is reproduced as follows. While the optical head 13 traces the track(s) of the optical disk 11, light reflected off the optical disk 11 is received by the photodetector. Then, the photodetector photoelectrically converts the received signal into a reproduced signal. The reproduced signal output from the photodetector is input to a preamplifier 16 so as to be amplified. The resultant reproduced signal is input to an equalizer 17. The equalizer 17 compensates the frequency characteristics of the signal. Then, the resultant reproduced signal A (shown in FIG. 12A) output from the equalizer 17 proceeds to each of two subsequent processing sequences shown in FIG. 11. One of the sequences includes a differentiator 18 and a zero crossing comparator 19, for digitizing the reproduced signal A. The other one of the sequences includes a high-pass filter 21, an amplifier 22, a clamping circuit 23, an envelope detector 24 and a comparator 25, for forming a digitized gate signal in accordance with a level of the reproduced signal A.

The differentiator 18 differentiates the reproduced signal A output from the equalizer 17 and outputs a signal B shown in FIG. 12B to the zero crossing comparator 19. The zero crossing comparator 19 generates a pulse signal every time the signal B becomes zero. As a result, a digitized signal C shown in FIG. 12C is obtained In such a manner, the reproduced signal A reproduced from the optical disk 11 is digitized.

On the other hand, the high-pass filter 21 removes a low-frequency component of the reproduced signal A output from the equalizer 17. The resultant signal with the low-frequency component removed is amplified by the amplifier 22, and is given a constant clamp voltage Vo shown in FIG. 12D as a reference level of the signal. Accordingly, a signal D shown in FIG. 12D is obtained which is then output to the envelope detector 24 and the comparator 25. The envelope detector 24 has a predetermined time constant such that when the signal D output from the clamping circuit 23 is input thereto, the level of the signal D is clipped by approximately 40%, thereby forming a threshold signal Sh shown in FIG. 12D which is output to the comparator 25. The comparator 25 compares the signal D shown in FIG. 12D and the threshold signal Sh so as to output a gate signal E shown in FIG. 12E. The gate signal E represents periods where the reproduced signal A output from the optical disk 11 reaches a certain level.

An AND circuit 26 determines an AND signal of the digitized signal C and the gate signal E so as to form a signal F shown in FIG. 12F.

By digitizing the signal A reproduced from the optical disk 11 through the differentiator 18 and the zero crossing comparator 19 as set forth heretofore, the digitized signal C representing the correct timing can be obtained.

However, when the reproduced signal A contains noise N as shown in FIG. 12A, this noise N may be undesirably digitized as well. In order to solve this problem, the gate signal E that represents the periods where the reproduced signal A is reaching the certain level, is formed through the high-pass filter 21, the amplifier 22, the clamping circuit 23, the envelope detector 24 and the comparator 25, and the AND of the signal C and the gate signal E is determined so as to obtain the signal F which is exclusive of effect caused by the noise N.

The signal F is input to a phase look loop (PLL) circuit 27 so as to be synchronized with a clock signal before being input to a demodulator 28. The demodulator 28 demodulates the signal synchronized with the clock signal (i.e., the signal subjected to PPM and/or PWM) so as to form a data signal and an error correction code signal The data signal is corrected based on the error correction code signal and then the data signal is output.

The above-described process of reading signals from the optical disk 11 is performed in a predetermined data unit, i.e., a sector.

Moreover, in the process of reading the signals, an error detector 29 determines whether the data signal has an error or not, for example, by a parity check. When it is determined that the data signal has an error, the process of reading the signal is repeated. Such a repeating of the process is directed by a host processor (not shown) or the like which exercises general control over each of the blocks shown in FIG. 11, in accordance with the flow chart of FIG. 13.

As shown in FIG. 13, when an instruction for reading the data occurs (Step 101, Yes), a count number RC of a retry counter is initialized to 0 (Step 102). Then, a signal for one sector is reproduced from the optical disk 11. A data signal and an error correction code signal are formed from the thus-obtained reproduced signal as described above (Step 103). Thereafter, it is determined whether or not the data signal has an error (Step 104). If there is no error in the data signal (Step 104, No), the process of reading data for one sector is completed (Step 105).

If there is an error in the data signal (Step 104, Yes), the count number RC of the retry counter is incremented by 1 (Step 106) which is checked to ensure that a predetermined permissive value N (Step 107, No) has not been exceeded. Then, the process returns to Step 103, whereby a signal from the same sector is reproduced again from the optical disk 11 so as to form a data signal and an error correction code signal (Step 103). If there is no error in the data signal (Step 104, No), the process of reading data for one sector is completed (Step 105). If there is an error in the data signal (Step 104, Yes), Steps 106, 107, 103 and 104 are repeated again. Each of Steps 106, 107, 103 and 104 is performed until the count number RC of the retry counter exceeds the permissive value N. When the count number RC exceeds the permissive value N (Step 107, Yes), the process stops and the occurrence of an error is reported (Step 108).

Data can be rewritten in a portion in a recording region of the optical disk 11 for about 0.5 to 1 million times depending on the conditions of use of the optical disk 11. However, a memory film of this portion can easily deteriorate. When such a deterioration of the memory film occurs, the low-frequency component contained the reproduced signal increases.

For example, a reproduced signal A containing the low-frequency component may become as represented in FIG. 14A. In this case, even when the reproduced signal A is digitized by the differentiator 18 and the zero crossing comparator 19 at correct timing so as to obtain the digitized signal C shown in FIG. 14C, a gate signal E may be incorrectly formed as shown in FIG. 14E due to undesirable level variation caused by the low-frequency component contained in the reproduced signal A. In this case, when an AND of the digitized signal C and the gate signal E is determined as shown in FIG. 14E, one of the pulses of the digitized signal C is undesirably neglected, thereby causing an error.

If such an error caused by the low-frequency component is present in one sector, the occurrence of errors is unavoidable in that sector, even when the data in that sector is repeatedly read-out.

SUMMARY OF THE INVENTION

According to one aspect of the invention, a data recording/reproducing device includes: a convertor for converting a signal reproduced from a recording medium so as to form a digitized signal; a gate signal generator for forming a digitized gate signal according to a level of the reproduced signal; a modulator for determining an AND of the digitized signal output from the convertor and the gate signal output from the gate signal generator and modulating data from the AND; and a data error detector for detecting a presence or an absence of an error in the modulated data and if an error is present, outputting a detected signal indicating the presence of the error. The data recording/reproducing device, in response to the detected signal output from the data error detector, repeats a reading operation to form a data from a reproduced signal. The gate signal generator includes an envelope detector and a comparator. The envelope detector has a time constant which is changed in accordance with the detected signal output from the data error detector, and forms a threshold signal that generally follows a level variation of the reproduced signal in accordance with the time constant. The comparator compares the reproduced signal and the threshold signal output from the envelope detector so as to form the gate signal.

In one embodiment, a data recording/reproducing device further includes a reporter for reporting that the time constant of the envelope detector is changed.

In another embodiment, a data recording/reproducing device further includes a controller for determining a time constant of the envelope detector when there is no error in the data that is formed in response to the detected signal output from the data error detector.

In still another embodiment, a data recording/reproducing device further includes a recorder for recording the data with no error in a recording region of a recording medium other than a recording region where the data is originally read, after determining the time constant of the envelope detector.

In yet still another embodiment, a data recording/reproducing device further includes a recorder for recording the time constant of the envelope detector determined by the controller when there is no error in the data, in the recording medium together with the associated data in a corresponding manner.

In still another embodiment, the recording region of the recording medium where the time constant of the envelope detector is recorded, has no error detected by the data error detector.

In still another embodiment, when a time constant of the envelope detector is read from the recording medium where there is no error in the data, the controller sets the read time constant as a time constant of the envelope detector before reading the data.

In still another embodiment, a data recording/reproducing device further includes: an error rate detector for determining an error rate of the data; and a controller for changing the time constant of the envelope detector in response to the detected signal output from the data error detector and repeating to form a data from a reproduced signal so as to determine a time constant of the envelope detector associated with a data with a minimum error rate determined by the error rate detector.

In still another embodiment, the gate signal generator further includes a high-pass filter for removing a low-frequency side of the reproduced signal. The high-pass filter changes its cutoff frequency in response to the detected signal from the data error detector.

In still another embodiment, the gate signal generator further includes a clamping circuit for giving a reference level to the reproduced signal and maintaining the reference level generally constant. The clamping circuit has a time constant that is changed in accordance with the detected signal output from the data error detector so as to suppress variation in the reference level of the reproduced signal.

According to another aspect of the present invention, a data recording/reproducing device includes; a convertor for converting a signal reproduced from a recording medium so as to form a digitized signal; a gate signal generator for forming a digitized gate signal according to a level of the reproduced signal; a modulator for determining an AND of the digitized signal output from the convertor and the gate signal output from the gate signal generator and modulating data from the AND; and a data error detector for detecting a presence or an absence of an error in the modulated data and if an error is present, outputting a detected signal indicating the presence of the error. The data recording/reproducing device, in response to the detected signal output from the data error detector, repeats a reading operation to form a data from a reproduced signal. The gate signal generator includes at least either one of a high-pass filter or a clamping circuit, and a comparator. The high-pass filter changes its cutoff frequency in response to the detected signal output from the data error detector. The clamping circuit gives a reference level to the reproduced signal, maintains the reference level generally constant, has a time constant which is changed in response to the detected signal output from the data error detector and suppresses a variation in the reference level of the reproduced signal in accordance with the time constant. The comparator compares the threshold value and the reproduced signal which has passed at least either one of the high-pass filter or the clamping circuit, so as to form a gate signal.

In one embodiment, a data recording/reproducing device further includes an envelope detector. The envelope detector has a predetermined time constant and forms a threshold signal that follows the level variation of the reproduced signal in accordance with the time constant. The comparator is given the threshold signal output from the envelope detector as a threshold value, and compares the reproduced signal which has passed at least either one of the high-pass filter or the clamping circuit with the threshold signal output from the envelope detector so as to form a gate signal.

In another embodiment, a data recording/reproducing device further includes a reporter for reporting that at least either one of the cutoff frequency of the high-pass filter or the time constant of the clamping circuit is changed.

In still another embodiment, a data recording/reproducing device further includes a controller for determining at least either one of the cutoff frequency of the high-pass filter or the time constant of the clamping circuit when there is no error in a data which is formed again in response to the detected signal output from the data error detector.

In yet still another embodiment, a data recording/reproducing device further includes a recorder for recording the data with no error in a recording region other than a recording region where the data is originally read, when the controller determines at least either one of the cutoff frequency of the high-pass filter or the time constant of the clamping circuit.

In still another embodiment, a data recording/reproducing device further includes a recorder for recording at least either one of the cutoff frequency of the high-pass filter or the time constant of the clamping circuit determined by the controller, when there is no error in the data.

In another embodiment, the recording region of the recording medium where at least either one of the cutoff frequency of the high-pass filter or the time constant of the clamping circuit is recorded, has no error detected by the data error detector.

In another embodiment, when at least either one of the cutoff frequency of the high-pass filter or the time constant of the clamping circuit is read from the recording medium where the data has a minimum error rate, the controller sets the cutoff frequency and the time constant as a cutoff frequency of the high-pass filter and a time constant of the clamping circuit before reading the data.

In another embodiment, a data recording/reproducing device further includes: an error rate detector for determining an error rate of the data; and a controller for changing at least either one of the cutoff frequency of the high-pass filter and the time constant of the clamping circuit in response to the detected signal output from the data error detector and repeating to form a data from a reproduced signal so as to determine the cutoff frequency of the high-pass filter and the time constant of the clamping circuit associated with a data with a minimum error rate determined by the error rate detector.

According to still another aspect of the present invention, a recording medium in which a data is recorded and from which a data is reproduced by a data recording/reproducing device. The data recording/reproducing device includes at least one of a high-pass filter having a changeable cutoff frequency, a clamping circuit having a changeable time constant and an envelope detector having a changeable time constant. At least one of the cutoff frequency of the high-pass filter, the time constant of the clamping circuit and the time constant of the envelope detector of the data is recorded together with the data.

According to the present invention, an envelope detector for generating a gate signal changes its time constant in accordance with a detected signal output from the data error detector. The envelope detector also forms a threshold signal which generally follows the level variation of the reproduced signal. The degree of the threshold signal to follow the level variation of the reproduced signal depends on the time constant. In response to the detected signal from the data error detector, data is formed again from a reproduced signal. That is to say, when a detected signal is output from the data error detector, the time constant of the envelope detector is changed and a data is formed again from the reproduced signal to repeat the same process. The threshold signal may be controlled to follow the level variation of the reproduced signal, for example, in a steeper manner. Thus, when an undesirable level variation is caused due to a low-frequency component contained in the reproduced signal, the threshold signal of the envelope detector may be controlled to follow the level variation so that the threshold signal itself contains a low-frequency component. Accordingly, when the reproduced signal and the threshold signal of the envelope detector are compared, the low-frequency components contained in both the reproduced signal and the threshold signal are compensated. As a result, a gate signal can be formed with the effect of the low-frequency component being eliminated. Accordingly, when an AND of the gate signal with no effect of low-frequency component, and a digitized signal is determined, errors caused by the low-frequency component contained in the reproduced signal can be suppressed.

The same effects as in the case where the time constant of the envelope detector is changed, can be obtained when a cutoff frequency of a high-pass filter or a time constant of a clamping circuit is changed.

Additionally or alternatively, instead of changing the time constant of the envelope detector, at least one of the cutoff frequency of the high-pass filter or the time constant of the clamping circuit may be changed. In these cases, the envelope detector may be omitted.

Thus, the invention described herein makes possible the advantages of (1) providing a data recording/reproducing device and a recording medium which are able to suppress an error caused by a low-frequency component contained in a reproduced signal.

These and other advantages of the present invention will become apparent to those skilled in the art upon reading and understanding the following detailed description with reference to the accompanying figures.

BRIEF DESCRIPTION OF THE DRAWINGS

FIG. 3A is a waveform diagram showing a waveform of a signal output from a first high-pass filter of the high-pass filter switching section;

FIG. 3B is a waveform diagram showing a waveform of a signal output from a second high-pass filter of the high-pass filter switching section;

FIG. 4A is a waveform diagram showing a waveform of a signal output from a first clamping circuit of the clamping circuit switching section;

FIG. 4B is a waveform diagram showing a waveform of a signal output from a second clamping circuit of the clamping circuit switching section;

FIG. 5A is a waveform diagram showing a waveform of a signal output from a first envelope detector of the envelope detector switching section;

FIG. 5B is a waveform diagram showing a waveform of a signal output from a second envelope detector of the envelope detector switching section;

FIGS. 14A through 14F are waveform diagrams each showing another waveform of signals generated in the conventional data recording/reproducing device.

DESCRIPTION OF THE PREFERRED EMBODIMENTS

Hereinafter, the present invention will be described by way of an illustrative example with reference to the accompanying drawings.

Figure 1:
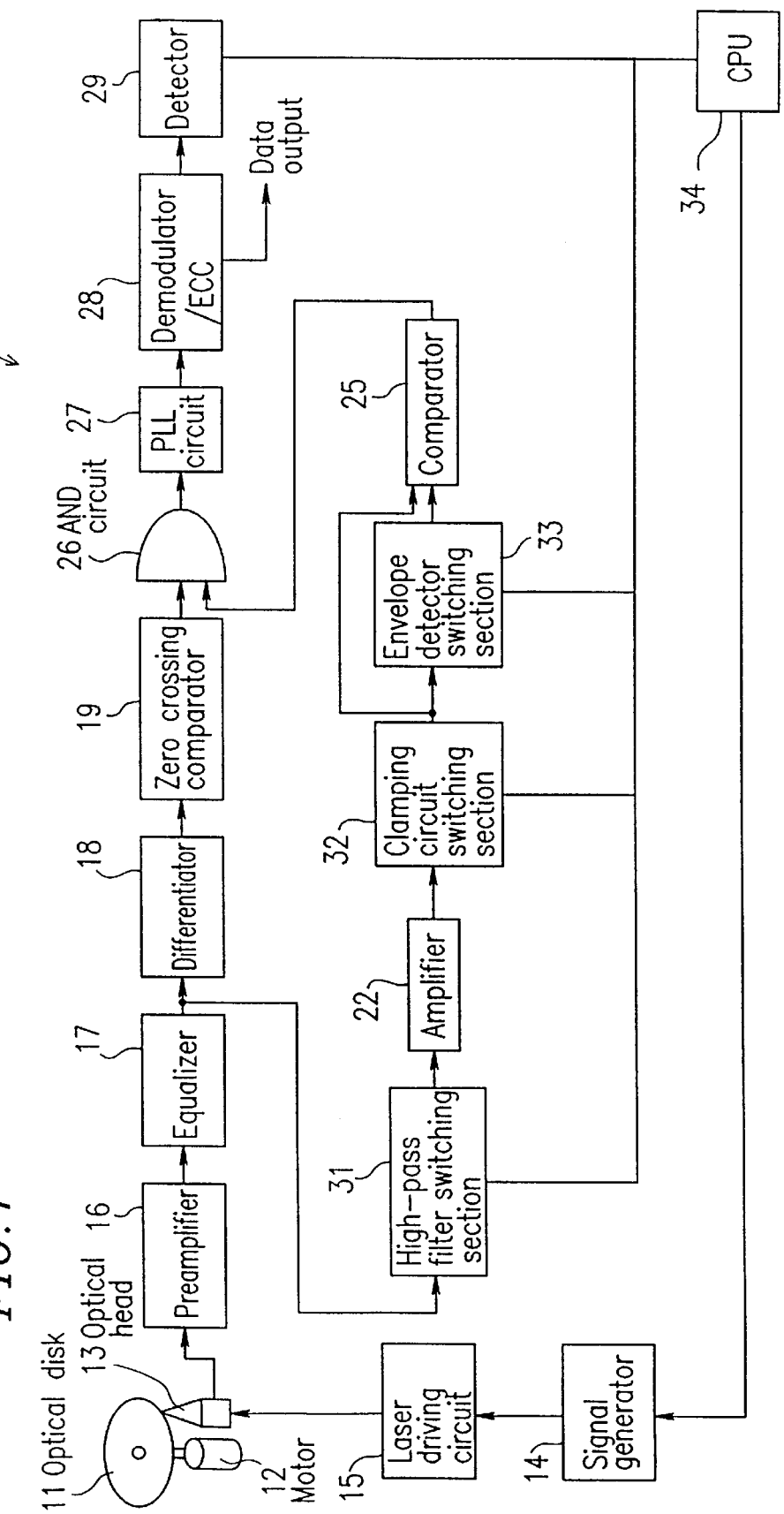
FIG. 1 is a block diagram showing a data recording/reproducing device according to an example of the present invention.

FIG. 1 is a block diagram showing a data recording/reproducing device 100 according to an example of the present invention. The data recording/reproducing device 100 differs from the above-described conventional data recording/reproducing device shown in FIG. 11 in that it includes a high-pass filter switching section 31, a clamping circuit switching section 32 and an envelope detector switching section 33, instead of the high-pass filter 21, the clamping circuit 23 and the envelope detector 24, respectively. In addition, the data recording/reproducing device 100 also differs from the above-described conventional data recording/reproducing device in that a detected signal from an error detector 29 is given to the high-pass filter switching section 31, the clamping circuit switching section 32 and the envelope detector switching section 33. The data recording/reproducing device 100 further includes a CPU 34 which exercises general control over each of the blocks and which controls the process of rewriting data.

Figure 2:
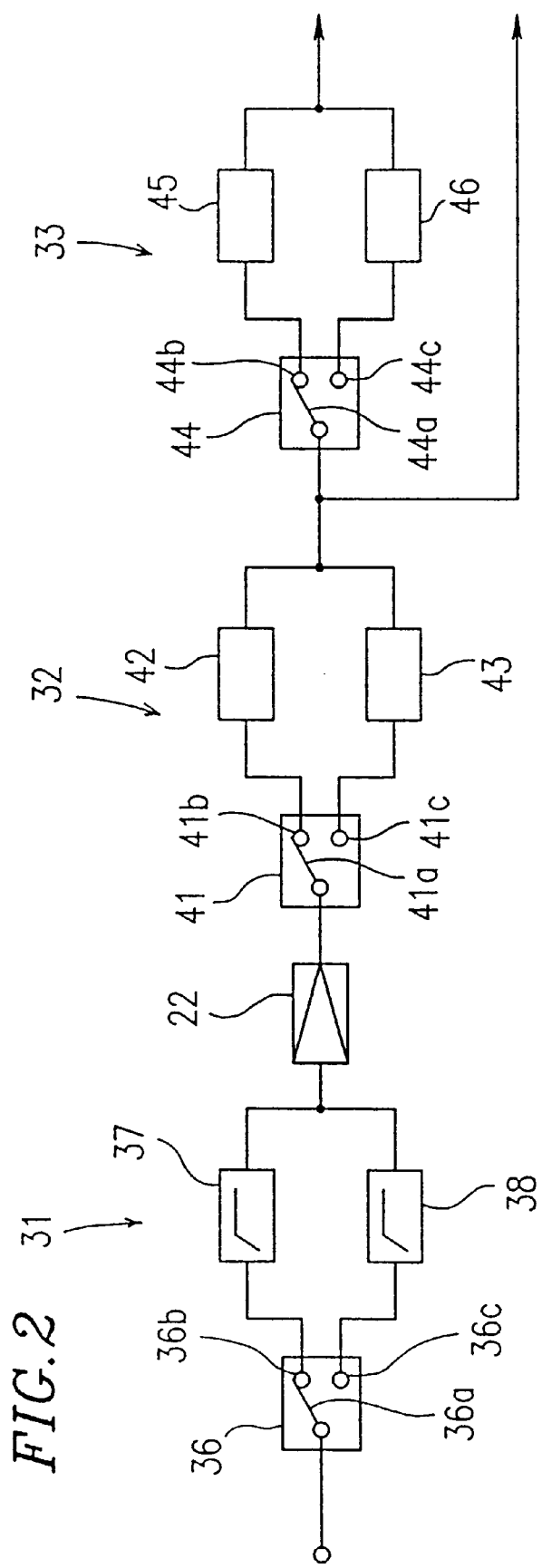
FIG. 2 is a block diagram showing a high-pass filter switching section, an amplifier, a clamping circuit switching section and an envelope detector switching section which are provided in the data recording/reproducing device according to the example of the present invention.

FIG. 2 is a block diagram showing the high-pass filter switching section 31, an amplifier 22, the clamping circuit switching section 32 and the envelope detector switching section 33.

As shown in FIG. 2, the high-pass filter switching section 31 includes a switch 36, a first high-pass filter 37 and a second high-pass filter 38. The switch 36 includes a portion 36a which is usually connected with a terminal 36b so that the first high-pass filter 37 is selected. When a detected signal is input from the error detector 29, the portion 36a is switched to a terminal 36c so as to select the second high-pass filter 38.

A cutoff frequency of the second high-pass filter 38 is set so as to be higher than that of the first high-pass filter. FIGS. 3A and 3B show waveforms of signals output from the first and the second high-pass filters 37 and 38, respectively, when the same signals are input thereto. As can be appreciated from FIGS. 3A and 3B, the second high-pass filter 38 with the higher cutoff frequency removes a greater amount of a low-frequency component contained in the input signal than the first high-pass filter 37.

Returning to FIG. 2, the clamping circuit switching section 32 includes a switch 41, a first clamping circuit 42 and a second clamping circuit 43. The switch 41 includes a portion 41a which is usually connected with a terminal 41b so that the first clamping circuit 42 is selected. When a detected signal is input from the error detector 29, the portion 41a is switched to a terminal 41c so as to select the second clamping circuit 43.

A time constant of the second clamping circuit 43 is set so as to be larger than that of the first clamping circuit 42. FIGS. 4A and 4B show waveforms of signals D output from the first and the second clamping circuits 42 and 43, respectively, when the same signals are input thereto. As can be appreciated from FIGS. 4A and 4B, the second clamping circuit 43 with the larger time constant clamps a reference level of the signal D in a much more relaxed manner, i.e., the level of the signal D reaches toward the clamp voltage Vo in a slower manner as compared to the case of the first clamping circuit 42.

As shown in FIG. 2, the envelope detector switching section 33 includes a switch 44, a first envelope detector 45 and a second envelope detector 46. The switch 44 includes a portion 44a which is usually connected with a terminal 44b so that the first envelope detector 45 is selected. When a detected signal is input from the error detector 29, the portion 44a is switched to a terminal 44c so as to select the second envelope detector 46.

The time constant of the second envelope detector 46 is set so as to be smaller than that of the first envelope detector 45. FIGS. 5A and 5B show waveforms of signals output from the first and the second envelope. detectors 45 and 46, respectively, when the same signals are input into the envelope detectors 45 and 46. As can be appreciated from FIGS. 5A and 5B, in the case of the second envelope detector 46 with the smaller time constant, a threshold signal Sh follows the level variation of the signal D output from the clamping circuit switching section 32 in a more dependent manner as compared to the case of the first envelope detector 45.

Figure 6:
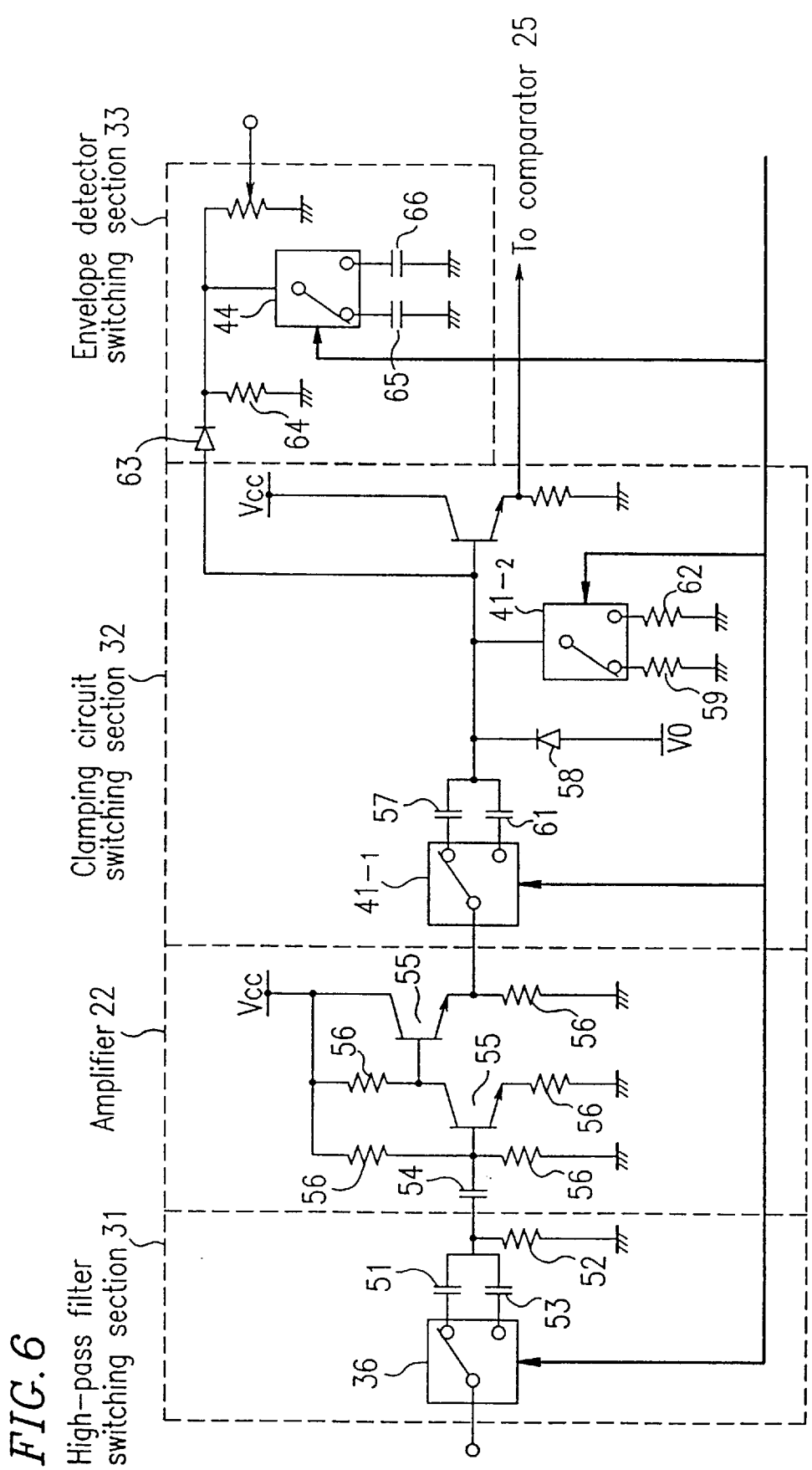
FIG. 6 is a circuit diagram specifically showing the high-pass filter switching section, the amplifier, the clamping circuit switching section and the envelope detector switching section which are provided in the data recording/reproducing device according to the example of the present invention.

FIG. 6 is a circuit diagram showing a specific configuration of the high-pass filter switching section 31, the amplifier 22, the clamping circuit switching section 32 and the envelope detector switching section 33.

The first high-pass filter 37 (FIG. 2) in the high-pass filter switching section 31 consists of a first capacitor S1 and a resistor 52 and the second high-pass filter 38 (FIG. 2) consists of a second capacitor 53 and the resistor 52. When the switch 36 is connected with the terminal 36b, the first high-pass filter 37 (FIG. 2) including the first capacitor 51 and the resistor 52 is selected. When the switch 36 is connected with the terminal 36c, the second high-pass filter 38 (FIG. 2) including the second capacitor 53 and the resistor 52 is selected.

The amplifier 22 includes a coupling capacitor 54, two transistors 55 and a plurality of resistors 56.

The switch 41 (FIG. 2) in the clamping circuit switching section 32, includes a first switch 41-1 and a second switch 41-2. The first clamping circuit 42 (FIG. 2) consists of a first capacitor 57, a diode 58 and a first resistor 59; and the second clamping circuit 43 (FIG. 2) consists of a second capacitor 61, the diode 58 and a second resistor 62. When the first switch 41-1 is connected with the terminal on the first capacitor 57 side while the second switch 41-2 is connected with the terminal on the first resistor 59 side, the first clamping circuit 42 is selected. Moreover, when the first switch 41-1 is switched to the terminal on the second capacitor 61 side while the second switch 41-2 is switched to the terminal on the second resistor 62 side, the second clamping circuit 43 is selected.

In the envelope detector switching section 33, the first envelope detector 45 (FIG. 2) consists of a diode 63, a resistor 64 and a first capacitor 65, and the second envelope detector 46 (FIG. 2) consists of the diode 63, the resistor 64 and a second capacitor 66. When the switch 44 is switched to the terminal on the first capacitor 65 side, the first envelope detector 45 (FIG. 2) including the diode 63, the resistor 64 and the first capacitor 65 is selected. When the switch 44 is switched to the terminal on the second capacitor 66 side, the second envelope detector 46 including the diode 63, the resistor 64 and the second capacitor 66 is selected.

In the data recording/reproducing device 100 having such a configuration as shown in FIG. 1, as long as the reproduced signal from the optical disk 11 contains a sufficiently small amount of low-frequency components that only cause a small level variation, the first high-pass filter 37, the first clamping circuit 42 and the first envelope detector 45 are selected. Therefore, the cutoff frequency of the high-pass filter switching section 31, the time constant of the clamping circuit switching section 32 and the time constant of the envelope detector switching section 33 are optimized, on the assumption that the level variation caused by the low-frequency component contained in the reproduced signal is sufficiently small.

Figure 11:
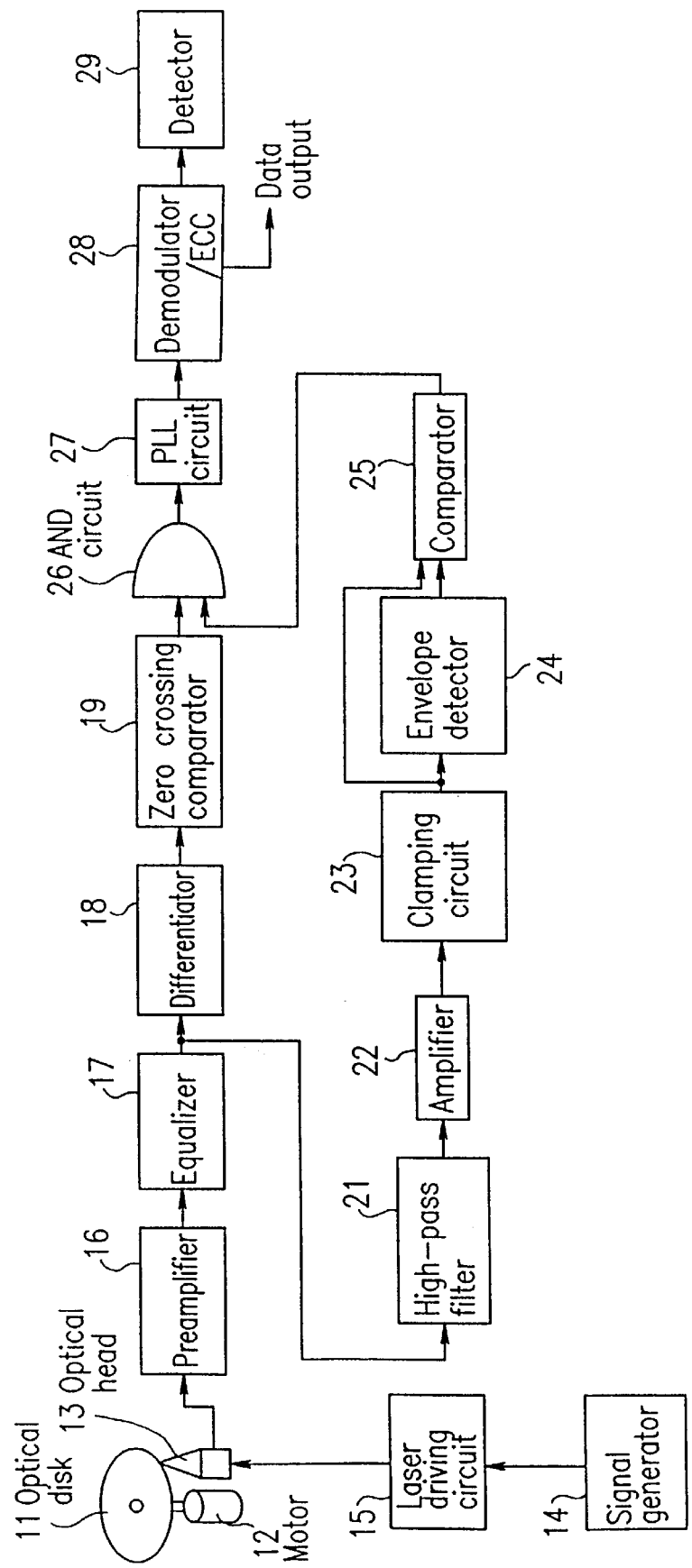
FIG. 11 is a block diagram showing a conventional data recording/reproducing device.

When the level variation caused by the low-frequency component contained in the reproduced signal is sufficiently small, the data recording/reproducing device 100 reproduces data generally in the same manner as the conventional device shown in FIG. 11. Specifically, an optical head 13 traces a track(s) of an optical disk 11 while a photodetector of the optical head 13 photoelectrically converts incident light reflected off the optical disk 11 into a reproduced signal. The reproduced signal output from the photodetector is input into a preamplifier 16 so as to be amplified and the resultant signal is input to an equalizer 17. The reproduced signal A shown in FIG. 12A is output from the equalizer 17 and input to the differentiator 18 and the high-pass filter switching section 31, respectively.

Figure 12:
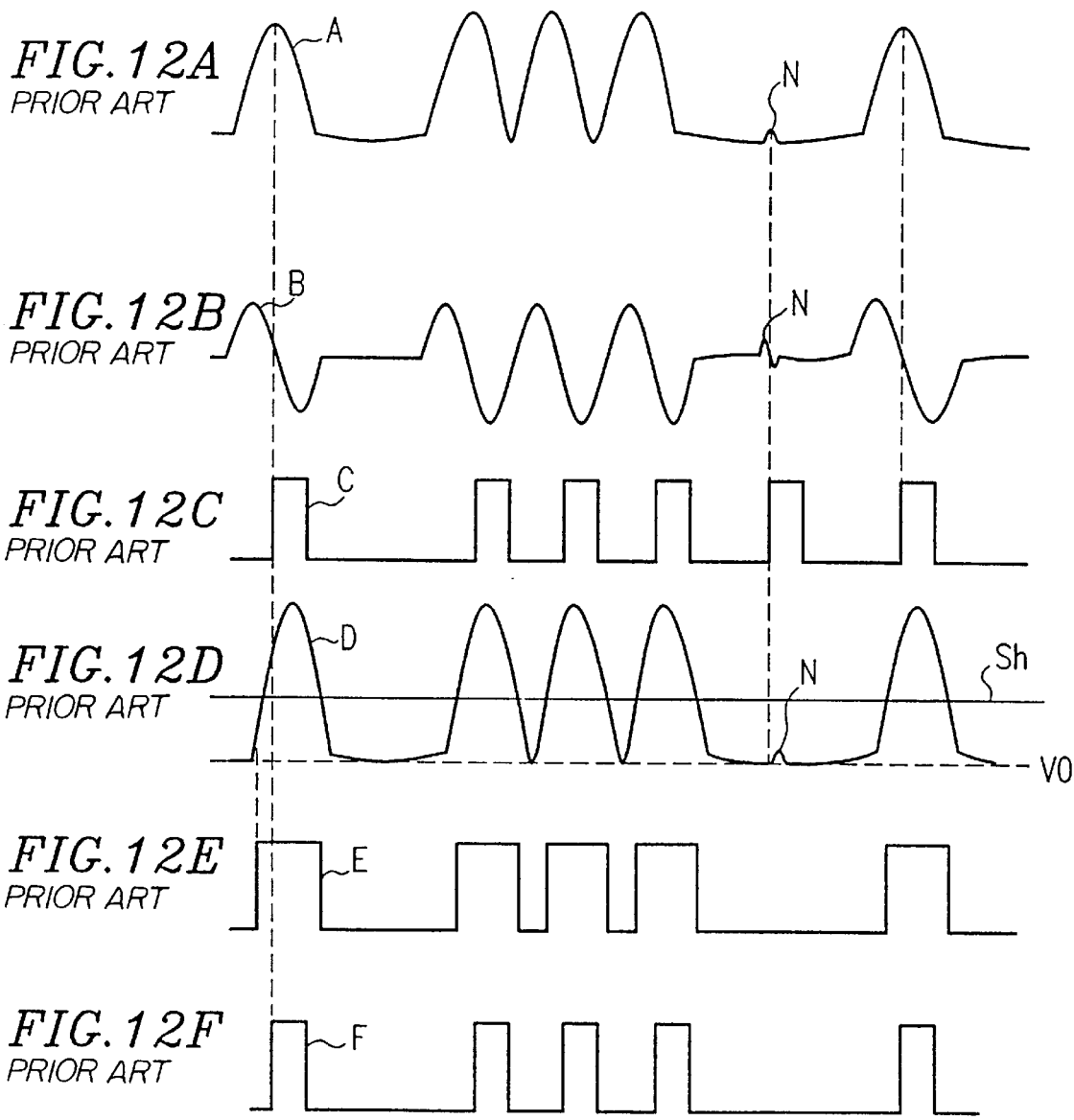
FIGS. 12A through 12F are waveform diagrams each showing a waveform of signals generated in a general data recording/reproducing device.
Figure 13:
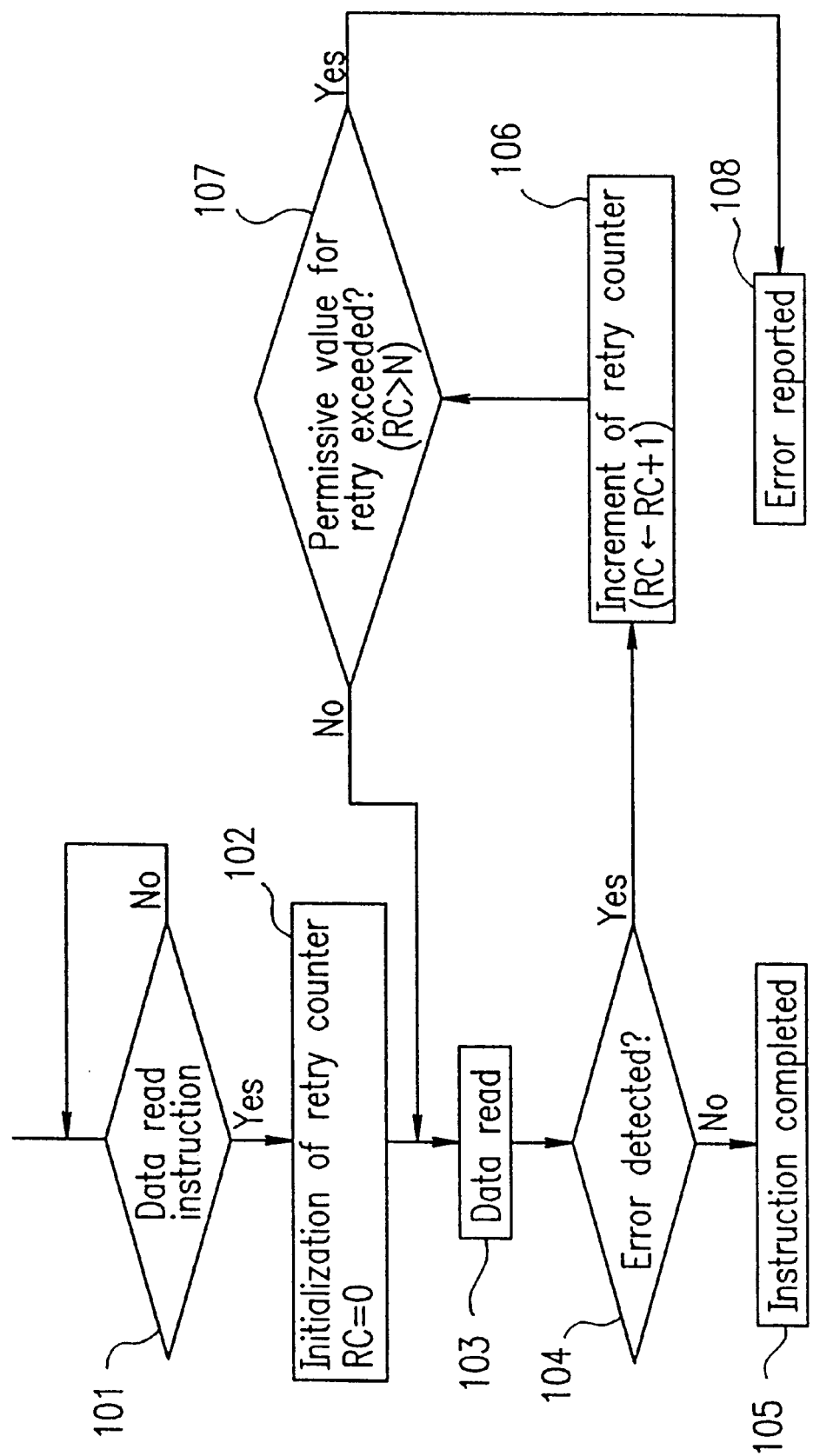
FIG. 13 is a flowchart showing a process performed in the conventional data recording/reproducing device.

The differentiator 18 differentiates the reproduced signal A so as to output a signal B shown in FIG. 12B to a zero crossing comparator 19. The zero crossing comparator 19 generates a pulse signal every time the signal B becomes zero, so as to output a digitized signal C shown in FIG. 12C.

The high-pass filter switching section 31 inputs the reproduced signal A into the first high-pass filter 37 (FIG. 2) so as to remove the low-frequency component of the reproduced signals. The resultant signal is amplified at the amplifier 22 and then input to the first clamping circuit 42 (FIG. 2) of the clamping circuit switching section 32. The first clamping circuit 42 (FIG. 2) provides the signal with a reference level and forms a signal D shown in FIG. 12D while maintaining the reference level of the signal as a constant clamp voltage Vo. The resultant signal is output to the first envelope detector 45 (FIG. 2) of the envelope detector switching section 33 and to a comparator 25. The first envelope detector 45 (FIG. 2) clips the level of the signal D by approximately 40% so as to form a threshold signal Sh shown in FIG. 12D, thereby outputting the threshold signal SH to the comparator 25. The comparator 25 compares the signal D and the threshold signal Sh so as to output a gate signal E shown in FIG. 12E.

An AND circuit 26 adds the digitized signal C and the gate signal E so as to form a signal F shown in FIG. 12F.

The signal F shown in FIG. 12F is input into a PLL circuit 27, thereby being synchronized with the clock signal. The resultant signal is input into a demodulator 28. The demodulator 28 demodulates the signal synchronized with the clock signal (i.e., a signal modulated by PPM and/or PWM) so as to form a data signal and an error correction code signal. The data signal is corrected based on the error correction signal before being output.

Such a process of reading signals from the optical disk 11 is performed on a predetermined data unit (sector).

Moreover, the error detector 29 determines the presence of an error in the data signal, for example, by a parity check. When it is determined that an error is present in the data signal, the signal reading process is repeated for a predetermined number of times.

Figure 7:
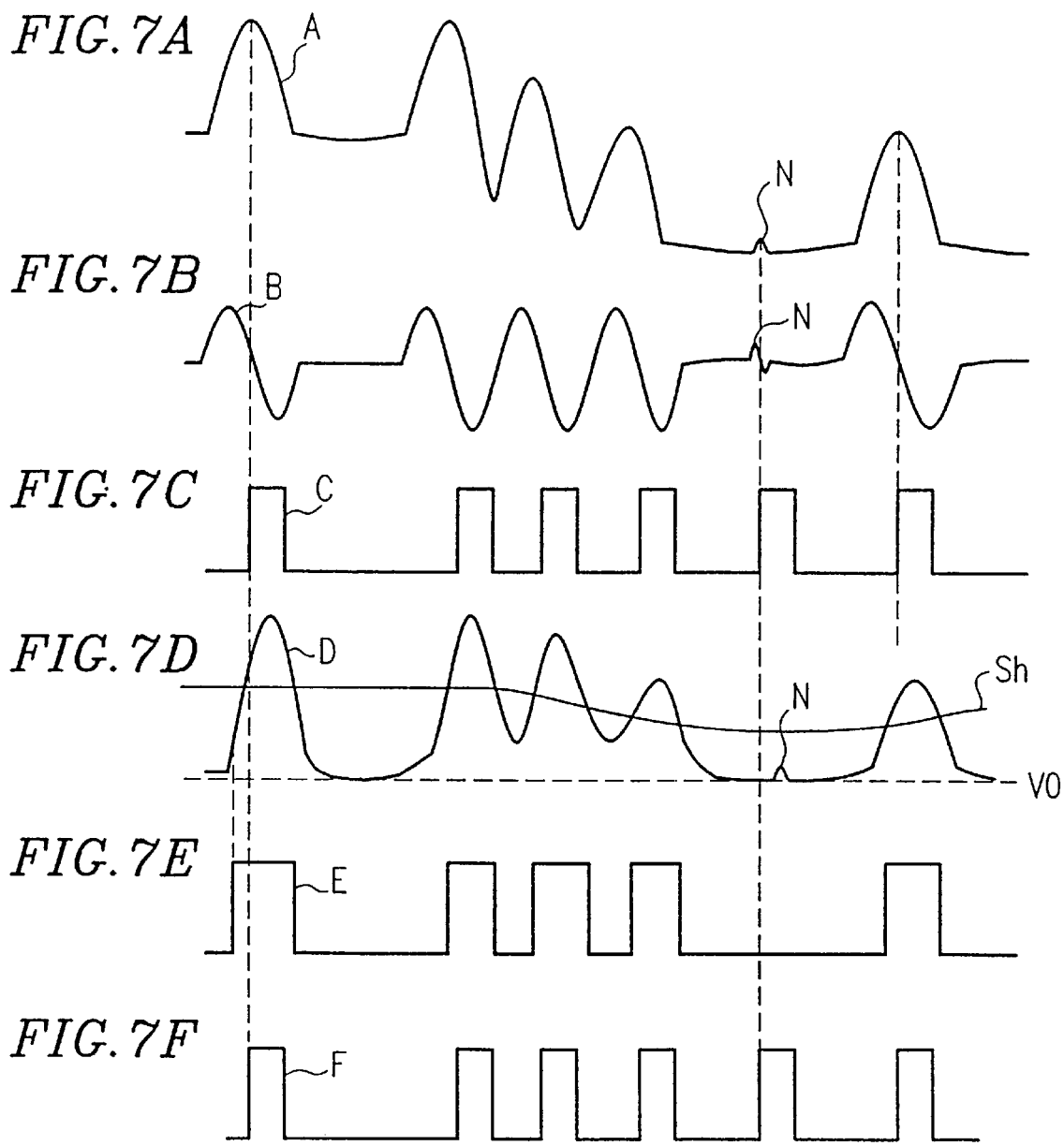
FIGS. 7A through 7F are waveform diagrams each showing a waveform of signals generated in the data recording/reproducing device according to the example of the present invention.

If the error in the signal is, for example, caused accidentally or caused due to malfunction, a data signal with no error may be obtained by repeating the above-described process. However, when a signal is reproduced from a deteriorated memory film such that a level variation caused by the low-frequency component contained in the reproduced signal is large as shown in FIG. 7A, the error of the data cannot be corrected only by repeating the above-described process.

According to the data recording/reproducing device 100 of the present invention, in the case where the data signal with no error cannot be obtained even after repeating the above-described process for a predetermined number of times, it is considered that the level variation caused by the low-frequency component contained in the reproduced signal is too large. In such a case, the CPU 34 controlling each block shown in FIG. 1 performs the process shown in the flowchart of FIG. 8.

First, if an error is still present in the data even after repeating the above-described read process for a predetermined number of times where the first high-pass filter 37 (FIG. 2), the first clamping circuit 42 (FIG. 2) and the first envelope detector 45 (FIG. 2) are selected (Step 201, Yes), the CPU 34 generates a data read instruction (Step 202) by which a count number RC of a built-in retry counter and a count number PCC of a built-in parameter counter are initialized to 0 (Step 203). Then, the CPU 34 selectively switches the switch 36 (FIG. 2) of the high-pass filter switching section 31, the switch 41 (FIG. 2) of the clamping circuit switching section 32 and the switch 44 (FIG. 2) of the envelope detector switching section 33 according to a predetermined switching pattern corresponding to a count number PCC0 of the parameter counter (Step 204).

Thereafter, the CPU 34 reproduces a signal for one sector from the optical disk 11 by driving and controlling a signal generator 14 and a moving mechanism (not shown) of the optical head 13. The reproduced signal is processed is described above so as to form a data signal and an error correction signal. The data signal is corrected based on the error correction code signal, and the corrected data signal is output (Step 205). The error detector 29 determines the presence of an error in the data signal, for example, by parity check (Step 206). If there is no error in the data signal (Step 206, No), the process of reading data for one sector is completed (Step 207).

On the other hand, when there is an error in the data signal (Step 206, Yes), the CPU 34 increments the count number RC of a retry counter by 1 (Step 208) and confirms that the count number RC of the retry counter does not exceed a predetermined permissive value N (Step 209, No). Then, the process returns to Step 205 where a signal is reproduced from the same sector of the optical disk 11 so as to form the data signal and the error correction code signal therefrom. If there is no error in the data signal (Step 206, No), the process of reading data for one sector is completed (Step 207). If the data signal still has an error (Step 206, Yes), Steps 208, 209, 205 and 206 are repeated.

Steps 208, 209, 205 and 206 are repeated until the count number RC of the retry counter exceeds the predetermined permissive value N. If an error of the data signal still exists even after the count number RC of the retry counter exceeds the predetermined permissive value N (Step 209, Yes), the CPU 34 initializes the count number RC of the retry counter to 0 while the count number PCC of the parameter counter is incremented to 1 (Step 210). Then, after checking that the count number PCC of the parameter counter does not exceed the permissive value M (Step 211, No), the switches 36, 41 and 44 (FIG. 2) are selectively switched according to a predetermined switching pattern corresponding to the count number PCC1 of the parameter counter (Step 204)

Thereafter, the process returns to Step 205, whereby a signal from the same sector of the optical disk 11 is reproduced and a data signal and an error correction code signal are formed therefrom. Then, if there is no error in the data signal (Step 206, No), the process of reading data for one sector is completed (Step 207). If there is an error in the data signal (Step 206, Yes), Steps 208, 209, 205 and 206 are repeated. If the count number RC exceeds the permissive value N while the error still remains in the data signal (Step 209, Yes), the count number RC of the retry counter is initialized to 0 and the count number PCC is incremented to 2 (Step 210). Then, after checking that the count number PCC does not exceed the permissive value (Step 211, No), the switches 36, 41 and 44 (FIG. 2) are selectively switched according to a predetermined switching pattern corresponding to the count number PCC2 of the parameter counter (Step 204).

Thereafter, the process is repeated as described above until the count number PCC of the parameter counter exceeds the permissive value M (Step 211, Yes). Once the count number PCC of the parameter counter exceeds the permissive value M, the error is reported (Step 212). The error may be reported, for example, by way of displaying so as to encourage a user, for example, to initiate or exchange the optical disk 11 for maintaining the reliability of data.

According to the present example, there are seven different patterns for switching the switches 36, 41 and 44 other than the initial state shown in FIG. 2. Whenever a pattern is switched to another pattern, at least the signal D or the threshold signal Sh shown in FIG. 7D changes.

For example, when the first high-pass filter 37 of the high-pass filter switching section 31 is selected, a signal shown in FIG. 3A is output, and when the second high-pass filter 38 is selected, a signal shown in FIG. 3B is output. In the signal shown in FIG. 3A, a low-frequency component which is output from the high-pass filter switching section 31 is reduced. Since the cutoff frequency of the second high-pass filter 38 is higher than that of the first high-pass filter 37, the low-frequency component of the signal shown in FIG. 3B is reduced more than the signal shown in FIG. 3A.

By changing from the first high-pass filter 37 to the second high-pass filter 38 in the high-pass filter switching section 31, the low-frequency component contained in the reproduced signal can be suppressed. Accordingly, the signal D and/or the threshold signal Sh which are input to the comparator 25 are changed as well. As a result, the resultant signal output from the comparator 25 is a gate signal E as shown in FIG. 7E which is input to an AND circuit 26 and becomes more accurate, thereby decreasing the occurrence of errors in the data caused by the low-frequency component.

Furthermore, when the first clamping circuit 42 is selected in the clamping circuit switching section 32, a signal D having a waveform shown in FIG. 4A is output, and when the second clamping circuit 43 is selected, a signal D shown in FIG. 4B is output. The second clamping circuit 43 has a larger time constant than that of the first clamping circuit 42. The larger time constant allows the reference level of the signal D to be clamped in a more relaxed manner, i.e., the level of the signal D reaches toward the clamp voltage Vo in a slower manner. In other words, when the time constant is larger, the signal D is less likely to follow the low frequency component exactly, and thus, the effect of the low-frequency component is suppressed. When such a signal D with the low-frequency component being suppressed is input to the comparator 25 so as to be compared with the threshold Sh from the envelope detector switching section 33, the comparison becomes more accurate. As a result, a more accurate gate signal E can be formed, thereby decreasing the occurrence of errors in the data signal caused by the low-frequency component.

Furthermore, when the first envelope detector 45 is selected at the envelope detector switching section 33, the threshold signal Sh shown in FIG. 5A is output, and when the second envelope detector 46 is selected, the threshold signal Sh shown in FIG. 5B is output. The second envelope detector 46 has a time constant smaller than that of the first envelope detector 45. The smaller time constant allows the threshold signal Sh to follow the signal D output from the clamping switching section 32 more closely. In other words, the threshold signal Sh changes in accordance with the low-frequency component of the signal D such that the threshold signal Sh contains a low-frequency component similar to that of the signal D. Accordingly, when the threshold signal Sh shown in FIG. 7D is input to the comparator 25 so as to be compared with the signal D output from the clamping circuit switching section 32, the low-frequency component contained in the threshold signal Sh and that contained in the signal D are compensated such that these signals can be compared without being affected by the low-frequency component. As a result, a more accurate gate signal E can be formed, thereby decreasing the occurrence of errors in the date signal caused by the low-frequency component.

As described above, the switch 36 of the high-pass filter switching section 31, the switch 41 of the clamping circuit switching section 32 and the switch 44 of the envelope detector switching section 33 may be selectively switched so as to select at least one of the second high-pass filter 38, the second clamping circuit 43 and the second envelope detector 46. Accordingly, the effect caused by the low-frequency component contained in the reproduced signal can be decreased, thereby minimizing the occurrence of errors in the data signal with certainty.

In the case where a frequency characteristic of a low-frequency component contained in a reproduced signal cannot be estimated, all seven types of switching pattern can be tried sequentially by repeating each of Steps 205, 206, 208, 209, 210 and 211. Accordingly, when the second high-pass filter 38, the second clamping circuit 43 and the second envelope detector 46 are suitably selected, the effect of the low-frequency component contained in the reproduced signal can be sufficiently minimized so that an accurate gate signal E can be formed, thereby obtaining a data with no errors.

Since a frequency characteristic of a low-frequency component caused by deterioration of a memory film may be experimentally preestimated, a suitable switching combination among the second high-pass filter 38, the second clamping circuit 43 and the second envelope detector 46 can be determined in advance. Thus, by setting this suitable switching pattern to be switched as a first switching pattern, the time required for the process can be shortened.

Although the present invention has been described for its effect in minimizing a low-frequency component generated due to deterioration of a memory film, the present invention is also effective in reducing the effects of low-frequency components caused by, for example, noise that cannot be erased from the memory film, nonuniformity of the memory film made during the production process and variations of each element (e.g., a variation in the cross-sectional shape of a laser beam). In these cases, too, an accurate date can be obtained.

Figure 9:
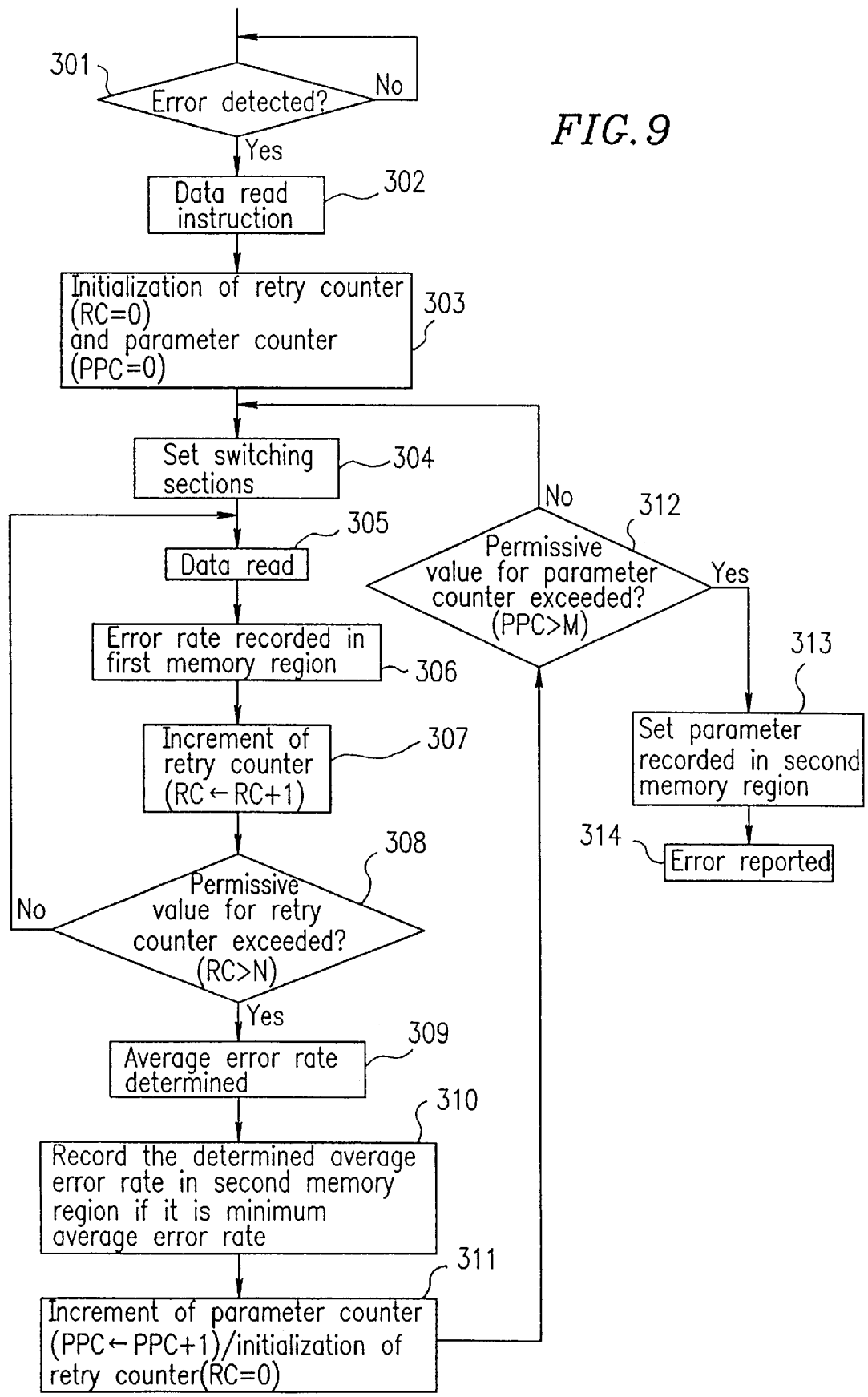
FIG. 9 is a flowchart showing another process performed in the data recording/reproducing device according to the example of the present invention.

FIG. 9 is a flowchart showing another example of a process performed in the data recording/reproducing device 100 shown in FIG. 1.

First, if an error is still present in the data even after repeating the above-described process of reproducing a signal for reading a data for a predetermined number of times where the first high-pass filter 37 (FIG. 2), the first clamping circuit 42 (FIG. 2) and the first envelope detector 45 (FIG. 2) are selected (step 301, Yes), the CPU 34 generates a date read instruction (Step 302) by which a count number RC of a built-in retry counter and a count number PCC of a builtin parameter counter are initialized to 0 (Step 303). Then, the CPU 34 selectively switches the switch 36 (FIG. 2) of the high-pass filter switching section 31, the switch 41 (FIG. 2) of the clamping circuit switching section 32 and the switch 44 (FIG. 2) of the envelope detector switching section 33 according to a predetermined switching pattern corresponding to a count number PCC0 of the parameter counter (Step 304).

Thereafter, the CPU 34 reproduces a signal from the optical disk 11 for one sector and processes this reproduced signal as previously described so as to obtain a data signal and an error correction code signal. The data signal is corrected based on the error correction code signal before being output (Step 305). While the data signal is corrected, the demodulator 28 detects an error rate of the data signal and notifies the error detector 29 of the obtained error rate. Then, in turn, the error detector 29 notifies the CPU 34 of the error rate. Eventually, the error rate is recorded in a first recording region in the CPU 34 (Step 306).

Subsequently, the CPU 34 increments a count number RC of the retry counter by 1 (Step 307) and confirms that the count number RC of the retry counter does not exceed a predetermined permissive value N (Step 308, No). Then, the process returns to Step 305 where a signal is reproduced from the same sector of the optical disk 11 so as to form the data signal and the error correction code signal therefrom. In Step 306, an error rate of the data signal is detected and reported to the CPU 34 by the error detector 29, thereby recorded in the first recording region of the CPU 34.

Steps 307, 308, 305 and 306 are repeated until the count number RC of the retry counter exceeds the permissive value N, and every time, the error rate of the data signal is detected and recorded in the first recording region of the CPU 34. When the count number RC exceeds the permissive value N (Step 308, Yes), the CPU 34 determines an average error rate for the obtained error rates (Step 309). The average error rate is recorded in a second recording region with the count number PCC0 of the parameter counter (Step 310). While repeating Steps 305 through 308, if there is a data signal with no error detected by the error detector 29, the CPU 34 also records such a data signal in the second recording region of the CPU 34 as well.

Then, while initializing the count number RC of the retry counter to 0, the count number PCC of the parameter counter is incremented by 1 and the first recording region of the CPU 34 is initialized (Step 311). Then, after checking that the count number PCC of the parameter counter does not exceed the permissive value M (Step 312, No), the switch 36 (FIG. 2) of the high-pass filter switching section 31, the switch 41 (FIG. 2) of the clamping switching section 32 and the switch 44 (FIG. 2) of the envelope detector switching section 33 are selectively switched in accordance with a predetermined switching pattern corresponding to the count number PCC1 of the parameter counter (Step 304).

Thereafter, the process returns to Step 305 to reproduce a signal from the optical disk 11 at the same sector so as to reform a data signal and error correction code signal from the reproduced signal. Then, an error rate of the data signal is detected and recorded in the first recording region of the CPU 34 (Step 306).

Once the count number RC of the retry counter exceeds the permissive value N after repeating Steps 307, 308, 305 and 306 (Step 308, Yes), an average of the obtained error rates are determined (Step 309). The CPU 34 then, compares the average error rate and the average error rate previously recorded in the second recording region and chooses the lower average error rate. The chosen lower average error rate is recorded in the second recording region with the associated count number PCC of the parameter counter that was set when the chosen average error rate was obtained.

Furthermore, if no error is detected by the error detector 29 for a data signal that is obtained at the above-mentioned count number PCC, such a data signal is also recorded in the second recording region of the CPU 34 (Step 310). Then, while the count number RC of the retry counter is initialized to 0, the count number PCC of the parameter counter is incremented to 2 and the first recording region of the CPU 34 is initialized (Step 311). After making sure that the count number PCC of the parameter counter does not exceed the permissive value M (Step 312, No), switches 36, 41 and 44 (FIG. 2) are selectively switched in accordance with the switching pattern corresponding to the count number PCC1 of the parameter counter (Step 304).

Eventually, the count number PCC of the parameter counter exceeds the permissive value M while repeating Steps 304 through 312 (Step 312, Yes). Thus, the count number PCC recorded in the second recording region should be the one corresponding to a data signal with the lowest error rate (Step 313). Lastly, the CPU 34 reports the occurrence of an error (Step 314).

Since the final count number PCC of Step 313 is obtained based on the comparisons among each of the average error rates in Step 310, it indicates the switching combination of the switches 36, 41 and 44 (FIG. 2) for obtaining a data signal with a lowest error rate can be obtained.

When a data with no error is obtained according to one of the above-described processes of the present invention (Step 207 or 313 shown in FIG. 8 or 9), the obtained data may be rewritten in a recording region of the optical disk 11 other than the original recording region where the data is first read out. By doing so, an error rate can be greatly lowered. Such a rewriting of date is conducted as follows.

Receiving a data signal for one sector from the demodulator 28, the CPU 34 rewrites the data for one sector in a recording region of the optical disk 11 other than the recording region where the data is first read out, by controlling the signal generator 14, the motor 12 and the moving mechanism of the optical head 13.

Then, the CPU 34 controls the signal generator 14, the motor 12 and the moving mechanism of the optical head 13 so as to read the rewritten data. When the rewritten data contains no error as detected by the error detector 29, the data write process is completed. In the case where the error detector 29 detects an error in the data, the CPU 34 rewrites the data for one sector in another recording region. Once again, the error detector 29 detects any errors in the rewritten data. If no error is found, the data rewriting process is completed.

If an error is found, the data for this sector is rewritten again in another recording region, and read out again for the error detector 29 to detect the presence of an error.

Figure 8:
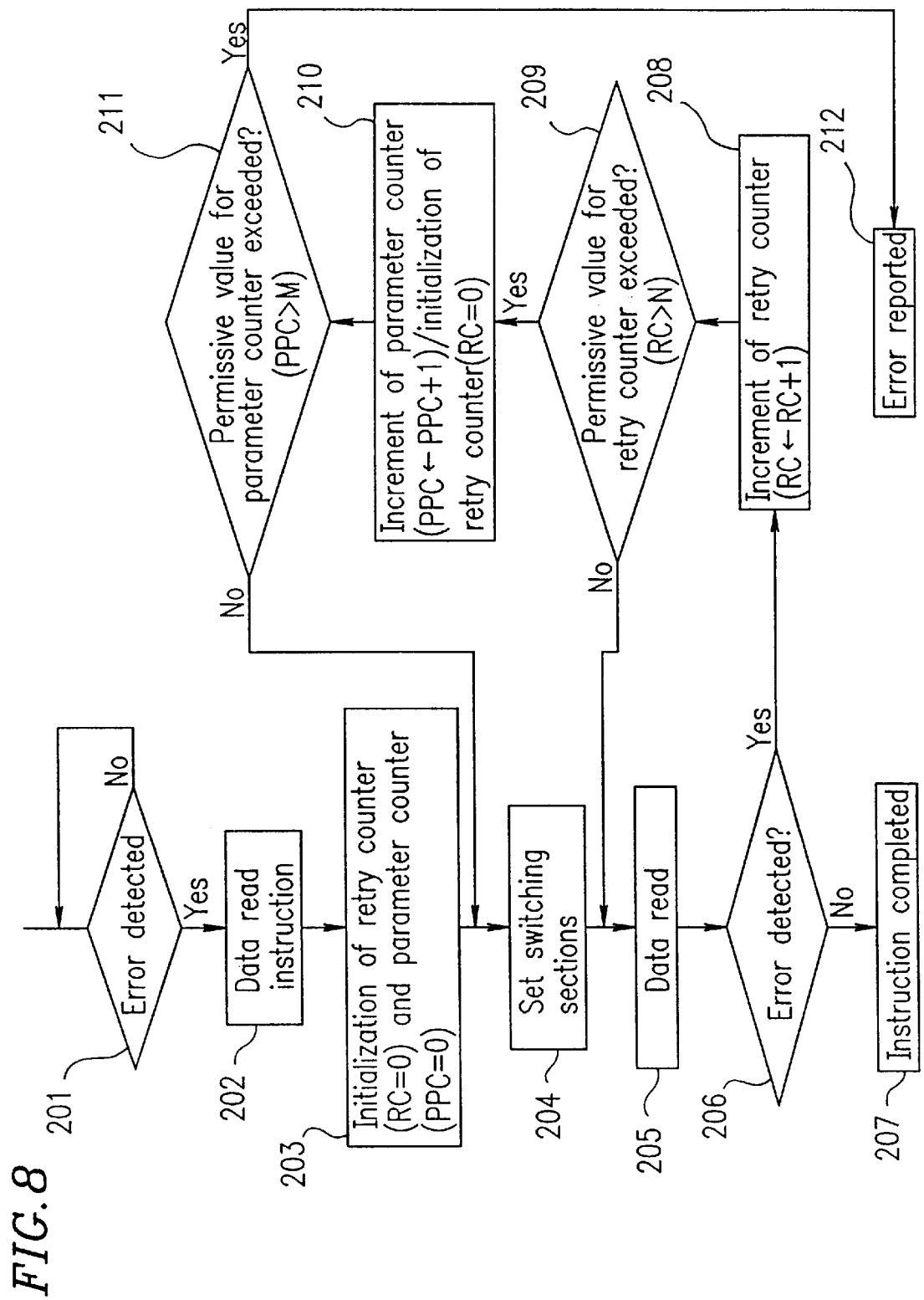
FIG. 8 is a flowchart showing a process performed in the data recording/reproducing device according to the example of the present invention.

When a data signal with no error is obtained according to the process shown in FIG. 8 or 9, the switching patterning of switches 36, 41 and 44 (FIG. 2) corresponding to the data may be recorded in the optical disk 11 together with the data. Since each switching pattern of switches 36, 41 and 44 corresponds to the count number PCC of the parameter counter, the count number PCC or a code indicating the count number PCC corresponding to the data may be recorded in the optical disk 11 together with the data.

Specifically, when a data with no error is obtained by the process shown in FIG. 8 or 9 (in Step 207 or Step 313), the CPU 34 controls the signal generator 14, the motor 12 and the moving mechanism of the optical head 13 to as to write the count number PCC of the parameter counter in a predetermined region.

Figure 10:
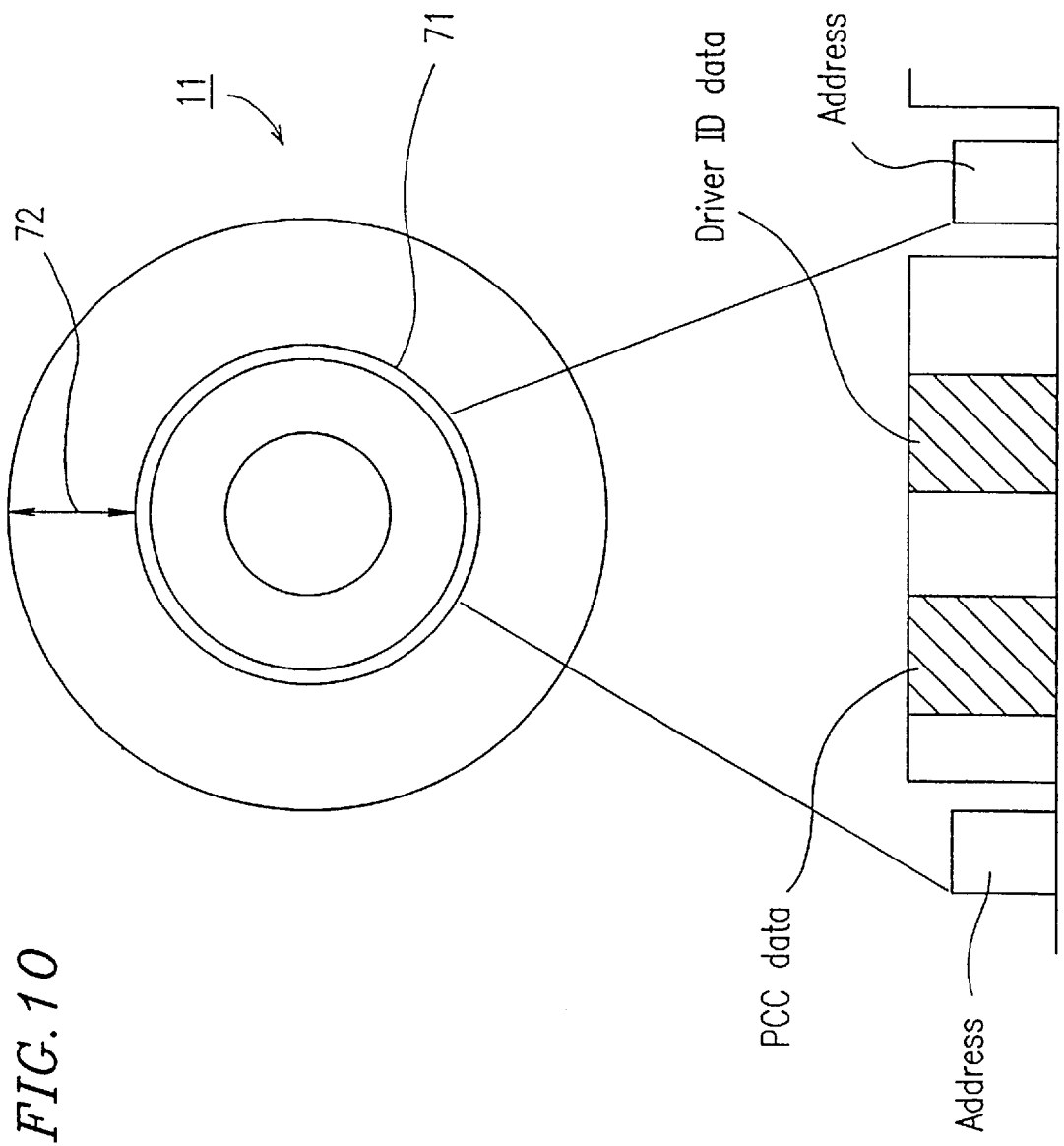
FIG. 10 is a plan view showing a recording medium according to an example of the present invention.

FIG. 10 is a schematic view showing a format of the optical disk 11. As shown in FIG. 10, the optical disk 11 includes a variable parameter region 71 in an inner region and a user region 72 in an outer region. The variable parameter region 71 includes address data, a PCC data indicating the count number PCC of the parameter counter and-a driver ID data, which are all written on the track(s) in advance. The user region 72 is used by a user to write the desired data.

The PCC data in the variable parameter region 71 consists of count number PCC and an address for each sector, the initial value of each count number PCC being set to 0 in advance. When there is an error in a data read from the optical disk 11 and the data is processed according to the process shown in FIG. 8 or 9, if a data with no error is obtained in Step 207 or 313, a value indicating the switching pattern of the switches 36, 41 and 44 (FIG. 2) corresponding to the obtained data is set as the count number PCC. The set count number PCC is recorded together with the address for the sector (a recording region) of the optical disk 11 where the data is read out.

Specifically, the count number PCC and the address for each sector are recorded. Then, the count number PCC and the address for each sector are read out for the error detector 29 (FIG. 1) to detect an error in the count number PCC or the address for each sector. If there is an error, the CPU 34 (FIG. 1) records the count number PCC and the address for each sector in another recording region within the variable parameter region 71. Then, the count number PCC and the address for each sector are read from the recording region so as to detect an error therein.

When a data is read from the optical disk 11, first, the address for the sector where the data is recorded is searched within the variable parameter region 71. Then, the count number PCC corresponding to the address for the data is read. The CPU 34 (FIG. 1) selectively switches the switches 31, 41 and 44 (FIG. 2) in accordance with the switching pattern corresponding to the count number PCC. Thereafter, by reading the data from the sector of the user region 72, the data can be quickly reproduced without making an error.

Accordingly, when a data is read while selectively switching the switches 36, 41 and 44 (FIG. 2) in accordance with the switching pattern corresponding to the count number PCC that is read in the above-described manner, the effect of a low-frequency component caused by, for example, deterioration of the memory film, noise that cannot be erased from the memory film and nonuniformity of the memory film that is generated during the production process, can be suppressed, thereby quickly obtaining an accurate data signal.

In the case where an error is detected in the data even when the switches 36, 41 and 44 (FIG. 2) are switched in accordance with the switching pattern corresponding to the count number PCC, the count number PCC may be set as a central value and can be replaced by gradually increasing or decreasing from the central value. Whenever the value is replaced, the switches 36, 41 and 44 (FIG. 2) are selectively switched in accordance with the replaced value. In such a manner, a data with no error can be obtained.

Furthermore, as driver ID data, identification data indicating each of a plurality of data recording/reproducing devices may be recorded as well as corresponding counter numbers thereof in the -variable parameter region 71. In this case, a data recording/reproducing device will search for identification data indicating the data recording/reproducing device in the variable parameter region 71 so as to read the count number PCC corresponding to the identification data. The CPU 34 selectively switches the switches 31, 41 and 44 (FIG. 2) in accordance with the switching pattern corresponding to the count number PCC. Accordingly, effect of a low-frequency component caused by, for example, variations in each element (e.g., a variation in the cross-sectional shape of a laser beam) can be minimized, thereby quickly obtaining an accurate data signal.

According to the present example, the count number PCC is set and recorded per sector. Alternatively, the count number PCC may be set and recorded per track of the optical disk 11.

The present invention is not limited to the above-described example, and may be modified in various ways. For example, three high-pass filters may be used in the high-pass filter switching section 31 so as to switch among them. Similarly, three clamping circuits and three envelope detectors may be used in the clamping circuit switching section 32 and the envelope detector switching section 33, respectively, so as to switch among them.

The high-pass filter, the clamping circuit switching section and the envelope detector may be formed of known circuit configurations.

Furthermore, the present invention is not only applied to an optical disk and a data recording/reproducing device using an optical disk as a recording medium, but also is applied to an optical recording medium such as an optical card or an optical tape, or a magnetic recording medium, a data recording/reproducing device using the magnetic recording medium, and the like.

According to the present invention, at least one of a cutoff frequency of the high-pass filter, a time constant of the clamping circuit and a time constant of the envelope detector is changed in response to a detected signal of the data error detector. Thus, the effect of a low-frequency component contained in the reproduced signal can be minimized, thereby suppressing an error in a data.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A data recording/reproducing device, comprising:

a converter for converting a signal reproduced from a recording medium so as to form a digitized signal;

a gate signal generator for forming a digitized gate signal according to a level of the reproduced signal;

a demodulator for determining an AND of the digitized signal output from the converter and the gate signal output from the gate signal generator and demodulating data from the AND; and a data error detector for detecting a presence or an absence of an error in the demodulated data and if an error is present, outputting a detected signal indicating the presence of the error, the data recording/reproducing device, in response to the detected signal output from the data error detector, repeats a reading operation to form a data from a reproduced signal, wherein:

the data recording/producing device includes a section for changing a time constant:

the gate signal generator includes an envelope detector and a comparator;

the envelope detector has a time constant which can be changed, and forms a threshold signal that generally follows a level variation reproduced signal in accordance with the time constant;

the section for changing a time constant chances a time constant of the envelope detector in response to the detected signal output from the data error detector; and the comparator compares the reproduced signal and the threshold signal output from the envelope detector so as to form the gate signal.

2. A data recording/reproducing device according to claim 1, further comprising a reporter for reporting that the time constant of the envelope detector is changed.

3. A data recording/reproducing device according to claim 1, wherein the section-for changing the time constant comprises a controller for determining a time constant of the envelope detector when there is no error in the data that is formed in response to the detected signal output from the data error detector.

4. A data recording/reproducing device according to claim 3, further comprising a recorder for recording the data with no error in a recording region of a recording medium other than a recording region where the data is originally read, after determining the time constant of the envelope detector.

5. A data recording/reproducing device according to claim 3, further comprising a recorder for recording the time constant of the envelope detector determined by the controller when there is no error in the data, in the recording medium together with the associated data in a corresponding manner.

6. A data recording/reproducing device according to claim 5, wherein the recording region of the recording medium where the time constant of the envelope detector is recorded, has no error detected by the data error detector.

7. A data recording/reproducing device according to claim 5, wherein, when a time constant of the envelope detector is read from the recording medium where there is no error in the data, the controller sets the read time constant as a time constant of the envelope detector before reading the data.

8. A data recording/reproducing device according to claim 1, further comprising:

an error rate detector for determining an error rate of the data; and wherein the section for changing the time constant comprises a controller for changing the time constant of the envelope detector in response to the detected signal output from the data error detector and repeating to form a data from a reproduced signal so as to determine a time constant of the envelope detector associated with a data with a minimum error rate determined by the error rate detector.

9. A data recording/reproducing device according to claim 1, wherein:

the gate signal generator further comprises a high-pass filter for removing a low-frequency side of the reproduced signal; and the high-pass filter changes its cutoff frequency in response to the detected signal from the data error detector.

10. A data recording/reproducing device according to claim 1, wherein:

the gate signal generator further includes a clamping circuit for giving a reference level to the reproduced signal and maintaining the reference level generally constant; and the clamping circuit has a time constant that is changed in accordance with the detected signal output from the data error detector so as to suppress variation in the reference level of the reproduced signal.

11. A data recording/reproducing device, comprising:

a converter for converting a signal reproduced from a recording medium so as to form a digitized signal;

a gate signal generator for forming a digitized gate signal according to a level of the reproduced signal;

a demodulator for determining an AND of the digitized signal output from the convertor and the gate signal output from the gate signal generator and demodulating data from the AND; and a data error detector for detecting a presence or an absence of an error in the demodulated data and if an error is present, outputting a detected signal indicating the presence of the error, the data recording/reproducing device, in response to the detected signal output from the data error detector, repeats a reading operation to form a data from a reproduced signal, wherein:

the data recording/reproducing device includes a section for changing a cutoff frequency or a time constant;

the gate signal generator includes at least either one of a high-pass filter or a clamping circuit, and a comparator;

the high-pass filter has a cutoff frequency which can be changed;

the clamping circuit gives a reference level to the reproduced signal, maintains the reference level generally constant, has a time constant which can be changed and suppresses a variation in the reference level of the reproduced signal in accordance with the time constant;

the section for-changing a cutoff frequency or a time constant changes the cutoff frequency of the high-pass filter or the time constant of the clamping circuit in response to the detected signal output from the data error detector; and the comparator compares the threshold value and the reproduced signal which has passed at least either one of the high-pass filter or the clamping circuit, so as to form a gate signal.

12. A date recording/reproducing device according to claim 11, further comprising an envelope detector, wherein:

the envelope detector has a predetermined time constant and forms a threshold signal that follows the level variation of the reproduced signal in accordance with the time constant; and the comparator is given the threshold signal output from the envelope detector as a threshold value, and compares the reproduced signal which has passed at least either one of the high-pass filter or the clamping circuit with the threshold signal output from the envelope detector so as to form a gate signal.

13. A data recording/reproducing device according to claim 11, further comprising for reporting that at least either one of the cutoff frequency of the high-pass filter or the time constant of the clamping circuit is changed.

14. A data recording/reproducing device according to claim 11, wherein the section for changing the cutoff frequency or time constant comprises a controller for determining at least either one of the cutoff frequency of the high-pass filter or the time constant of the clamping circuit when there is no error in a data which is formed again in response to the detected signal output from the data error detector.

15. A data recording/reproducing device according to claim 11, further comprising a recorder for recording the data with no error in a recording region other than a recording region where the data is originally read, when the controller determines at least either one of the cutoff frequency of the high-pass filter or the time constant of the clamping circuit.

16. A data recording/reproducing device according to claim 11, further comprising a recorder for recording at least either one of the cutoff frequency of the high-pass filter or the time constant of the clamping circuit determined by the controller, when there is no error in the date.

17. A data recording/reproducing device according to claim 16, wherein the recording region of the recording medium where at least either one of the cutoff frequency of the high-pass filter or the time constant of the clamping circuit is recorded, has no error detected by the data error detector.

18. A data recording/reproducing device according to claim 16, wherein, when at least either one of the cutoff frequency of the high-pass filter or the time constant of the clamping circuit is read from the recording medium where the data has a minimum error rate, the controller sets the cutoff frequency and the time constant as a cutoff frequency of the high-pass filter and a time constant of the clamping circuit before reading the data.

19. A data recording/reproducing device according to claim 11, further comprising:

an error rate detector from determining an error rate of the data; and wherein the section for changing the cutoff frequency or time constant comprises a controller for changing at least either one of the cutoff frequency of the high-pass filter and the time constant of the clamping circuit in response to the detected signal output from the data error detector and repeating to form a data from a reproduced signal so as to determine the cutoff frequency of the high-pass filter and the time constant of the clamping circuit associated with a data with a minimum error rate determined by the error rate detector.

* * * * *